July 10, 1962   M. H. BRISCOE   3,043,210
PORTABLE THERMAL BONDING DEVICE
Filed April 7, 1961   2 Sheets-Sheet 1

INVENTOR.
Madison H. Briscoe
BY
Mead, Browne, Schuyler & Beveridge.
ATTORNEYS

July 10, 1962
M. H. BRISCOE
3,043,210
PORTABLE THERMAL BONDING DEVICE
Filed April 7, 1961
2 Sheets-Sheet 2
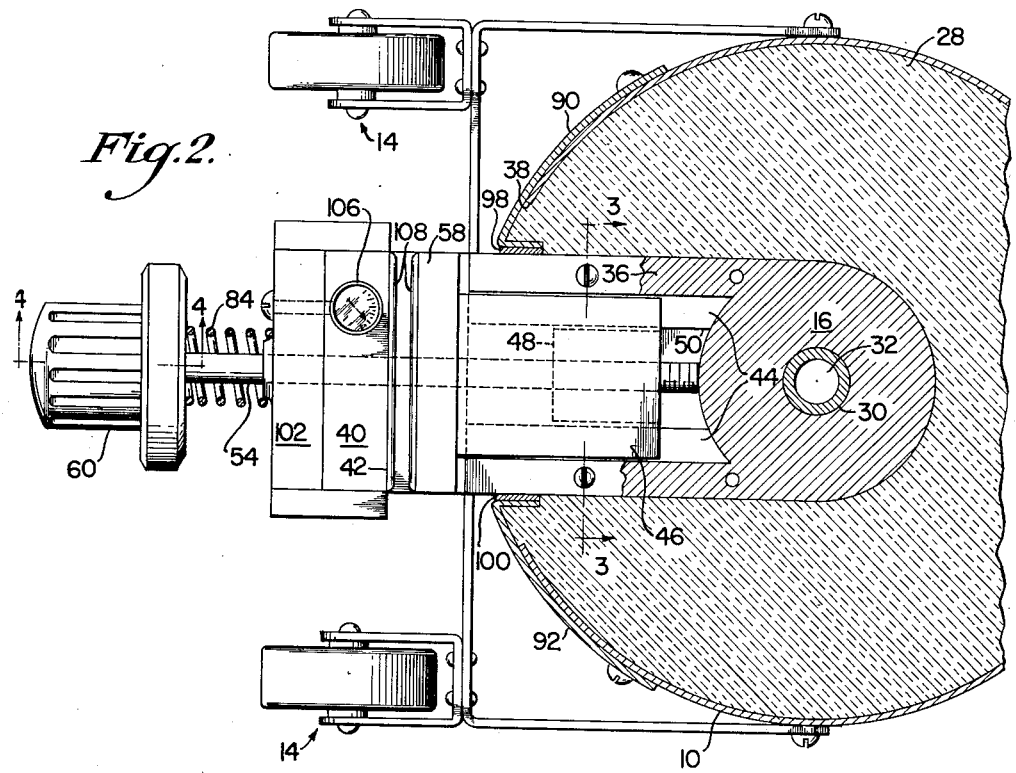
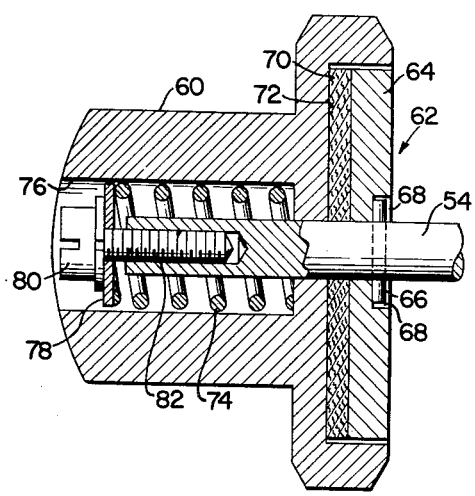
INVENTOR.
Madison H. Briscoe
BY
Mead, Browne, Schuyler & Beveridge.
ATTORNEYS

United States Patent Office 3,043,210
Patented July 10, 1962

3,043,210
PORTABLE THERMAL BONDING DEVICE
Madison H. Briscoe, Athens, Ga., assignor to Circular Banding Company, Inc., Athens, Ga., a corporation of Georgia
Filed Apr. 7, 1961, Ser. No. 101,544
14 Claims. (Cl. 100—93)

This invention relates to portable thermal bonding devices, and more particularly to devices for thermally bonding spinning tapes or the like into endless belts for employment in driving textile machinery.

The present invention is especially useful in textile mills where large numbers of endless driving belts are employed for power transmission purposes in textile machines such as spinning frames, for example. These belts are conventionally made by joining the ends of a strip or tape made from spun natural fibers or synthetic materials, primarily cotton or nylon. As might be expected, the critical portion of these belts is the joint or overlapped portion at which the respective ends of the strip or tape are joined to each other to form the endless belt.

In the past, many efforts have been directed toward the achievement of a satisfactory joint by sewing or stitching, by the employment of various forms of clips or by adhesively bonding overlapped ends of the tape to each other. Such tapes are employed in large numbers and require frequent repair or replacement, which is accomplished with the tape installed on the machine. In recent years, many mills have adopted the practice of forming the joints by thermally bonding overlapped tape ends to each other by the employment of a low melting point nylon bonding strip which is sandwiched between the overlapped taped ends and heated to a point at which the nylon melts to fuse or bond the overlapped tape ends to each other.

In order that nylon strip bonds of the foregoing type may be made at the machine upon which the endless belt is to be employed, present practice in forming such bonded joints frequently involves the use of two electrically heated plates which are applied to opposite sides of the joint to accomplish the thermal bonding process. To afford the necessary mobility, such plates are either battery powered or provided with a relatively long electrical extension cord so that the plates can be furnished with electrical power at the point of use.

Both of these methods are inconvenient. Thus, the battery operated devices require frequent replacement or recharging of the batteries since it is necessary to continuously draw substantial current from the battery to maintain the plates at the necessary operating temperatures. Since machines upon which belts of the type under discussion are employed are customarily arrayed in rows in rather large rooms, the extension cord operated devices require extremely long cords to supply power to the plates at machines which may be located at some distance from the nearest electrical outlet. Because of their length and the relatively high power requirements, such cords are not only cumbersome and inconvenient on the mill room floor, but also must employ relatively large and expensive electrical conductors in order to minimize power loss within the cord itself.

It is therefore an object of the present invention to provide a portable thermal bonding device for thermally bonding spinning tapes or the like which may be maintained at a desired operating temperature for substantial periods of time independent from power sources.

It is another object of the invention to provide a thermal bonding device of the foregoing type capable of storing large quantities of heat, and which is readily portable and requires only infrequent connection to a power source to maintain the device at operating temperatures.

The foregoing, and other objects, are achieved in a portable bonding device in which a relatively massive core or heat reservoir is disposed within a thermally insulated casing. The core is provided with an electrical heater which, when energized, is operable to raise the temperature of the core to a desired operating temperature. A clamping jaw assembly is disposed at the exterior of the casing, and the elements of the clamping jaw assembly are either integral with or located in heat conducting relationship with the core.

The jaw assembly is operated by a screw which may be manipulated to shift a movable jaw of the jaw assembly into and out of clamping engagement with a fixed jaw. The clamping screw is provided with a slip clutch which may be adjusted to slip when a predetermined clamping pressure is exerted by the jaws against each other.

The core and clamping jaw assembly are preferably constructed of a material having both a high specific heat and high enough heat conductivity characteristics so that heat is conducted adequately from the core to the clamping jaws while the high specific heat minimizes the rate of heat loss from the exposed portions of the device. To extend the operating period of the device independent from a source of electrical power, the mass of the core is much greater than the mass of the clamping jaw assembly so that a given temperature drop at the jaw assembly requires a proportionately large extraction of heat from the core.

Other objects and features of the invention will become apparent by reference to the following specification and to the drawings.

In the drawings:

FIGURE 2 is a cross-sectional view of the device of FIGURE 1 taken on line 2—2 of FIGURE 1;

FIGURE 3 is a detail cross-sectional view taken on line 3—3 of FIGURE 2; and

FIGURE 4 is a detail cross-sectional view taken on line 4—4 of FIGURE 2.

Figure 1:
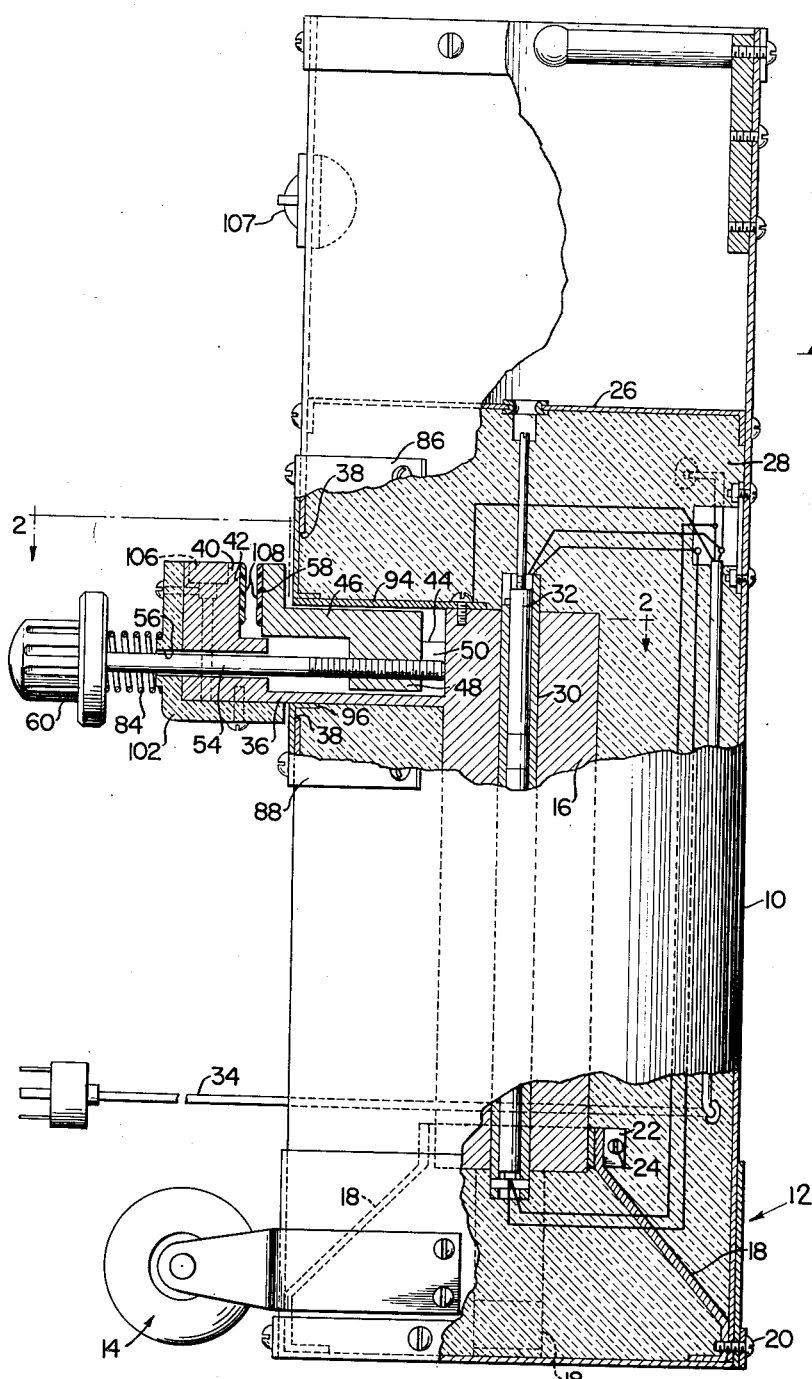
FIGURE 1 is a side elevational view, of a portable bonding device embodying the invention, shown partially in cross-section and with certain parts broken away.

The portable bonding device disclosed in the drawings includes a cylindrical outer casing 10 having a fixed bottom closure assembly 12 upon which a dual wheel assembly 14 is mounted to facilitate movement of the device from place to place. Casing 10 is preferably constructed from a reasonably heavy, bonded fiber material while bottom closure 12 may be of metallic material for greater durability. A relatively massive cylindrical metal body or core 16 is supported centrally within casing 10 by a plurality of support legs 18 fixedly secured to bottom closure 12 as by bolts 20. The upper ends of supporting legs 18 are fixed to a circular clamping band 22 which is contracted by a screw 24 into clamping supporting engagement with the lower end of core 16. A cover-plate 26 is mounted in the interior of casing 10 at a point spaced above the upper end of core 16 and the interior of casing 10 below plate 26 is filled with a suitable thermal insulating material 28.

A cartridge type electrical heater 30 is mounted within a central bore extending through core 16 and preferably is provided with a thermostatically controlled switch 32 of conventional construction to control operation of heater 30 when the heater is connected to an electric power source by power cord 34.

A laterally projecting arm portion 36, preferably formed integrally with core 16, extends from one side of the core to project through an opening 38 in casing 10. At the outer end of arm portion 36, a fixed jaw 40 is formed as an integral part of arm 36 and includes an inwardly facing clamping surface 42. As best seen in the cross-sectional view of FIGURE 3, arm 36 is formed with an upwardly opening guideway 44 upon which a movable jaw assembly 46 is supported for sliding movement toward and away from fixed jaw 40. In order to increase the heat transfer efficiency between arm 36 and movable jaw assembly 46, assembly 46 is elongated in its direction of movement along guideway 44 to increase the area of contact between arm 36 and assembly 46. A depending lug portion 48 on assembly 46 is received within a slot 50 extending downwardly from guideway 44 in arm portion 36, and an internally threaded bore 52 in lug 48 threadably receives a clamping screw 54 whose inner end projects through lug 48 into engagement with the side of core 16 at the inner end of slot 50. As best seen in FIGURE 1, screw 54 projects freely outwardly through an enlarged bore 56 in fixed jaw 40. By manipulating screw 54, a clamping jaw 58 formed as an integral portion of jaw assembly 46 may be moved into and out of engagement with clamping surface 42 on fixed jaw 40.

In order to accurately control the pressure exerted upon an object clamped between fixed jaw 40 and movable jaw 58, clamping screw 54 is rotated by a knob 60 which is rotatably supported upon screw 54 and rotatively coupled to screw 54 by a slip clutch assembly designated generally 62. Clutch assembly 62 includes a plate member 64 mounted upon screw 54 and held against rotation relative to screw 54 by a pin 66 which passes through and projects from opposite sides of screw 54 and is received within slots 68 in plate 64. A disc 70 of fibrous material, such as leather, is mounted upon screw 54 between plate 64 and flat surface 72 on knob 60. Disc 70 provides a frictional coupling between surface 72 of knob 60 and plate 64, the degree of coupling between the two surfaces being dependent upon the magnitude of the force pressing surface 72 and plate 64 against the opposite sides of disc 70.

The magnitude of this force is regulated by a compression spring 74 located within a bore 76 in knob 60 and engaged at one end against the bottom of bore 76. The opposite end of compression spring 74 is seated against a washer 78 engaged against the head 80 of clutch adjusting screw 82 threadably received in the outer end of clamping screw 54. It is believed apparent that adjustment of screw 82 will adjust the compressive force exerted by spring 74 against knob 60 and thus adjust the degree of frictional coupling between knob 60 and plate 64. Clutch 62 may thus be adjusted to slip when the force of engagement between the fixed and movable jaws reaches a predetermined magnitude.

Jaws 40 and 58 are normally biased towards each other by a relatively weak compression spring 84 which is seated between knob 60 and fixed jaw 40. Spring 84 normally biases knob 60 to the left as viewed in FIGURE 1, thus drawing movable jaw assembly 46 to the left as viewed in FIGURE 1 toward engagement with fixed jaw 40.

Opening 38 is closed to a minimum size consistent with the passage of arm portion 36 and movable jaw 46 by suitably located covers such as 86, 88, 90 and 92 and pads such as 94, 96, 98, and 100, all preferably made of thermal insulating materials. The exterior surfaces of fixed jaw 40 and the exposed portions of arm portion 36 are likewise covered with a thermal insulating material indicated at 102.

In order to be sure that the opposed clamping surfaces are within a desired temperature range, fixed jaw 40 is bored to receive an indicating thermometer 106 of suitable construction.

In use, body or core 16 acts as a reservoir of heat which is conducted to the opposed surfaces of fixed jaw 40 and movable jaw 58 to apply sufficient heat to thermally fuse or bond overlapped end portions of cotton spinning tapes to each other by melting a bonding strip of low melting point nylon located between the overlapped tape ends. Heater 30 is intermittently employed to raise core 16 to the desired working temperature and, because of the relatively low rate of heat loss from the completely insulated core and the partially insulated jaws, the device maintains the jaws within the desired working temperature range for a substantial period of time.

In order to achieve this result, the material from which core 16, arm 36, fixed jaw 40 and movable jaw assembly 46 is constructed should desirably possess a high specific heat characteristic in order to minimize the rate of heat loss and, at the same time, should possess high heat conductivity characteristics adequate to maintain the temperature of the jaws in a substantially constant relationship to the temperature of the relatively massive core 16. In addition, the material employed should possess chemical and physical stability over a temperature range extending from room temperature to approximately 500° F.

The foregoing characteristics are all possessed to a satisfactory degree by aluminum which, in addition, is both reasonable in cost and easy to cast or machine. Preferably, in order to achieve optimum heat conductivity characteristics, core 16, arm portion 36 and fixed jaw 40 are cast as a single integral piece of aluminum. Movable jaw assembly 46 is likewise constructed from aluminum and provided with a relatively large area of bearing engagement with guideways 44 on arm portion 36 to provide for ample transmission of heat from arm 36 to jaw assembly 46.

Since fixed jaw 40 and movable jaw 48 are partially exposed, it is desirable that these parts be kept as small as possible in relationship to the relatively massive core 16 consistent with the heat transmission requirements of the bonding operation. Desirably, the mass ratio between core 16 and the jaw assembly including fixed jaw 40 and movable jaw 46—58 should be relatively high, and preferably the mass of core 16 should be of the order of twenty times as great as the combined mass of the fixed and movable jaws. The larger the mass of core 16, and the higher its specific heat, the longer is the period of time during which the jaws are maintained within the desired temperature range.

In operation, power cord 34 is plugged in to raise the temperature of core 16 to the desired temperature which, for bonding cotton tapes or tapes containing cotton with the use of a low melting point nylon bonding strip, is represented by a jaw temperature between 300 and 330° F. or, to bond nylon tapes, is represented by a jaw temperature of between 300 and 400° F. To speak in terms of a specific example, for a device in which the weight of the aluminum core is approximately 20 lbs. and the combined weight of the fixed and movable jaws is approximately 1 lb., a 1,000 watt electric heater (such as 30) will raise the jaw temperature from approximately 70° F. to approximately 400° F. in about thirty minutes. In the specific structural arrangement shown, there is an approximate temperature drop of about 50° between the jaws and the center of the core, hence with a jaw temperature of say 390° the temperature of the core will be approximately 440°.

In the specific unit referred to above, experience has shown that the hourly heat loss from the unit within its working temperature range is slightly less than 150 B.t.u. per hour. Assuming the total mass of the aluminum core and jaws to be approximately 21 lbs., and the specific heat of aluminum to be approximately .24, when the unit is heated to a point where the jaw temperature is 390° (for bonding nylon tapes) the total operating range is some 90° F. and the total number of B.t.u. available for use is equal to the product of the total mass multiplied by the temperature range multiplied by the specific heat or approximately 450 B.t.u. The heat employed in an actual bonding opertion is so small as to have a negligible effect on the rate of heat loss, and hence, from the foregoing, it is seen that once the unit is raised to the top of the normal operating temperature range, it may be used over a period of approximately three hours before it is necessary to again plug in the heating unit to raise the temperature of the core and jaws.

When cotton tapes are bonded to each other by means of a bonding strip of low melting point nylon, the approximate operating temperature range is between 300 and 330° F. Because of this smaller operating range, the unit may be used for approximately one hour between successive reheating operations.

Assuming the unit to be at its operating temperature, spring 84 normally maintains movable jaw 58 in contact with fixed jaw 40. If a cotton tape is to be bonded by an interposed bonding strip of low melting point nylon, the operator pushes in on knob 60 to compress spring 84 and separate the jaws a sufficient distance to insert the overlapped tape, with the nylon bonding strip interposed therebetween, between the jaws. Knob 60 is then released momentarily to permit the jaws to close and tack the joint together.

The operator then again pushes in on knob 60 to open the jaws and the entire joint overlap is located between jaws 40 and 58. The knob is then released to close the jaws and then tightened by rotation of knob 60 which causes screw 54 to drive movable jaw assembly 46 away from core 16 to clamp the joint firmly between the jaws. Experience has shown that variations in pressure influence the strength of the bonded joint, and preferably clutch assembly 62 will have been previously adjusted to permit knob 60 to rotatively slip when the jaw pressure reaches the approximate desired value. The jaws are allowed to remain in their clamped position for a period of time sufficient to apply the desired amount of heat to the bonded joint; the heating time for ⅝" wide cotton tapes bonded by a low melting point nylon strip being within the range of 15 to 30 seconds. A mechanical timer, 107, may be employed to signal the end of the heating period.

Preferably the clamping surfaces of fixed jaw 40 and movable jaw 58 are coated with Teflon strips such as 108 to prevent the tapes or bonding material from adhering to the jaws.

While I have described but one embodiment of the invention, it will be apparent to those skilled in the art that the disclosed embodiment may be modified. Therefore, the foregoing description is to be considered exemplary rather than limiting and the true scope of the invention is that defined in the following claims.

I claim:

1. A portable thermal bonding device for bonding spinning tapes or the like comprising a thermally insulated casing, a gripper jaw assembly accessible with respect to the exterior of said casing for receiving and clampingly gripping a tape to be bonded, a heat storing body enclosed in said casing and connected in direct thermal conductive relationship to said jaw assembly to provide a heat reservoir for supplying heat to said jaw assembly, said body being adapted to store a large quantity of heat relative to the rate at which heat is lost from said body and said jaw assembly, and heating means in said casing for heating said body to an elevated temperature.

2. A portable thermal bonding device for bonding spinning tapes or the like comprising a thermally insulated casing, a heat reservoir comprising a body of a material having relatively high specific heat and heat conductivity characteristics enclosed within said casing, a gripper jaw assembly connected in direct thermal conductive relationship with said body and having a pair of opposed bonding surfaces thereon at the exterior of said casing adapted to receive and clampingly grip a tape to be bonded, said body being adapted to store a large quantity of heat relative to the rate at which heat is lost from said jaw assembly, and heating means in said casing operable to heat said body to an elevated temperature.

3. A portable thermal bonding device as defined in claim 2 wherein said gripper jaw assembly comprises a fixed jaw and a movable jaw, said fixed jaw being integral with said body and said movable jaw being slideably guided upon a portion of said jaw assembly integral with said body.

4. A portable thermal bonding device as defined in claim 2 wherein said body is adapted to store a sufficient quantity of heat to maintain the bonding surfaces of said jaw assembly within a temperature range of between 300° and 400° F. for a period of at least fifteen minutes without requiring operation of said heating means.

5. A portable thermal bonding device for bonding spinning tapes or the like comprising a thermally insulated casing, a relatively massive body of metallic material having relatively high specific heat and heat conductivity characteristics enclosed within said casing, a gripper jaw assembly adapted to receive and clampingly grip a tape to be bonded at the exterior of said casing, means connecting said jaw assembly in direct thermal conductive relationship with said body to conduct heat from said body to a tape gripped by said jaw assembly, and heating means in said casing for heating said body to an elevated temperature.

6. A portable thermal bonding device for bonding spinning tapes or the like comprising a thermally insulated casing, a relatively massive body of metallic material having relatively high specific heat and heat conductivity characteristics enclosed within said casing, a fixed jaw member on said body projecting from said body to the exterior of said casing, a movable jaw member of said metallic material, means for moving said movable jaw into and out of opposed clamping relationship with said fixed jaw, and heating means in said casing for heating said body to an elevated temperature.

7. A portable bonding device as denfied in claim 6 wherein said fixed jaw is integral with said body, the total mass of said body being approximately twenty times the combined mass of the fixed jaw portion of said body and the movable jaw.

8. A portable thermal bonding device for bonding spinning tapes or the like comprising a thermally insulated casing, a relatively massive body of metallic material having relatively high specific heat and heat conductivity characteristics enclosed within said casing, an arm integral with said body and projecting outwardly from the body to the exterior of said casing, a fixed jaw integral with the outer end of said arm facing inwardly toward said body, a movable jaw member of said metallic material slideably mounted upon said arm for movement toward and away from said fixed jaw, means for moving said movable jaw member into and out of opposed clamping relationship with said fixed jaw, and heating means in said casing for heating said body to an elevated temperature.

9. A portable thermal bonding device as defined in claim 8 wherein said arm is formed with a guideway adapted to slideably support and guide said movable jaw, said movable jaw being elongated in its direction of movement along said arm to increase the area of contact between said arm and movable jaw to thereby facilitate the transfer of heat from said arm to said movable jaw.

10. A portable thermal bonding device for thermally bonding spinning tapes or the like comprising a thermally insulated casing, a relatively massive body of metallic material having relatively high specific heat and heat conductivity characteristics enclosed within said casing, heating means received within said body for heating said body to an elevated temperature, an arm portion integral with said body and projecting outwardly from the body to the exterior of said casing, a fixed jaw integral with the outer end of said arm facing inwardly toward said body, a movable jaw member of said metallic material slideably mounted upon said arm for movement toward and away from said fixed jaw, a jaw operating screw threadably received within said movable jaw and having an inner end projecting from said movable jaw and engageable with said body, said screw projecting freely outwardly through said fixed jaw, and means on the outer end of said screw at the exterior of said fixed jaw for rotating said screw.

11. A portable bonding device as defined in claim 10 wherein said means on the outer end of said screw comprises a knob mounted on the outer end of said screw, and a compression spring seated between said fixed jaw and said knob to normally bias said movable jaw into engagement with said fixed jaw.

12. A portable bonding device as defined in claim 10 wherein said means on the outer end of said screw comprises a knob rotatably mounted upon the outer end of said screw, and adjustable friction clutch means rotatively coupling said knob to said screw.

13. A portable bonding device as defined in claim 12 including a compression spring seated between said knob and said fixed jaw to normally bias said movable jaw into engagement with said fixed jaw.

14. A portable thermal bonding device for bonding spinning tapes or the like comprising a thermally insulated casing, a relatively massive aluminum body enclosed within said casing, a fixed jaw member integral with said body and projecting from said core to the exterior of said casing, a movable aluminum jaw member, means for moving said movable jaw into and out of opposed clamping relationship with said fixed jaw, the combined mass of said fixed jaw member and said movable jaw member being less than one tenth the mass of said body, and heating means in said casing for heating said body to a temperature of at least 350° F.

No references cited.